3,202,616
COLORIMETRIC DETERMINATION OF FLUORIDE CONTENT OF WATER

Pratt H. Johnson, St. Petersburg, Fla., assignor to Milton Roy Company, Philadelphia, Pa., a corporation of Pennsylvania
No Drawing. Filed May 17, 1962, Ser. No. 195,416
1 Claim. (Cl. 252—408)

This invention relates generally to the determination of the fluoride content of water, and more particularly to improve reagents for determining the presence of sub-micro quantities of fluoride in water, occurring for example as a result of intentional fluoridation of drinking water to reduce dental caries.

The recent popularity of fluoridation of drinking water has made desirable an economical and reliable means for accurately and frequently testing samples of fluoridated drinking water to maintain a check on the concentration of fluoride therein, normally within a range of up to 1.6 parts per million.

Generally, the determination of the concentration of fluoride ions in water has been either colorimetric or titrimetric, with the colorimetric methods being based on the bleaching action of the fluoride on a dye or lake. However, the water samples usually contain substances which interfere with the bleaching action so that a distillation to remove these interfering substances is required prior to the analysis.

One method, known as the thorium or lanthanum chloranilate method, gives a positive color development but has two disadvantages in that one of the reagents is nearly insoluble, and in that the wave length at which the method has the needed sensitivity is in the ultra-violet light range. The reagent must be weighed and added in dry form and colorimeter equipment sensitive to light in the ultra-violet range is necessary, making this method slow, cumbersome, and expensive.

It has been recognized heretofore that alizarin complexan forms a red chelate with cerium III metal, and that when a reagent containing this red chelate is mixed into a sample of water containing fluoride ions, a blue chelate complex is formed. Because of the formation of the blue chelate complex is relatively specific to fluoride, the light absorption characteristics of a water sample containing the blue complex will be related to the density of the fluoride in the sample, thereby making possible colorimetric determination of the fluorine content with photo cell equipment. Prior art solutions of the above mentioned alizarin chelate have been unsuitable for practical use in automatic colorimeter equipment because when the solutions are buffered to a pH at which the light absorption curves of the blue complexans provide the most desirable results, a precipitation occurs within a few days making the solution unsuitable as a convenient, storable reagent for use in automatic colorimeter equipment in the hands of attendants who may be unskilled in the preparation of such reagents or do not have the facilities or time for the exacting preparation of suitable reagents. Another problem encountered in the development of a reagent suitable for widespread use in automatic equipment results from the coagulation of the blue chelate complex when formed in city water containing traces of excess coagulant from water purification treatments.

Accordingly, it is an object of this invention to provide an improved blue chelate complex forming reagent which is in liquid form and may be stored for periods exceeding a month without precipitation or notable loss of sensitivity, which may be used in colorimetric equipment without danger or detriment thereto and which may be utilized to determine fluoridation of water without coagulation of the color producing complex when used in samples of city water having traces of coagulant remaining therein from purification processes.

Another object of this invention is the provision of an improved reagent for determining the fluoride content of water and comprising an alizarin chelate of metal selected from the group consisting of lanthanum, cerium III and praseodymium, in combination with polyvinyl pyrrolidone which acts to prevent coaggulation of the chelate when introduced into water containing traces of a coagulating agent.

Still another object of this invention is the provision of an improved reagent for determining the fluoride content of water and comprising a chelate of lanthanum, cerium III or praseodymium metal in a solution buffered as by sodium acetate-acetic acid, and which reagent contains dilute isopropanol to prevent precipitation by the acid buffer, thereby providing a conveniently storable reagent.

Other objects and advantages of this invention will become apparent from the following detailed description of a presently preferred form of reagent embodying the invention.

In the preferred form of the invention described hereinafter, there is provided a particularly stable and reliable lanthanum chelate reagent for colorimetric analysis of water to determine the fluoride content thereof. The improved reagent has a full strength storage life exceeding a month and on the order of about 45 days, after which a slight decrease in sensitivity is noted. Moreover, the improved reagent is relatively unaffected by traces of coagulant found in water as a result of water purification treatment.

Alizarin complexan dye (3 aminomethylalizarin-NN-diacetic acid) when combined with lanthanum nitrate in solution, forms a red chelate of lanthanum. This read lanthanum chelate, when placed in the presence of fluoride ions, will further form a blue complex with the complex existing in a 1:1 mole relation with the chelate. If the read chelate solution is mixed with a blank sample of water, the blank sample readily transmits light in the read portion of the spectrum, for example having wavelengths in the range of 600 to 675 millimicrons. However, when the red chelate solution is mixed with a test sample of water containing fluoride ions, there is formed in the sample the above described blue complex which absorbs rather than transmits light of the mentioned red wavelengths.

When the solution is properly buffered, the amount of blue complex formed in the test sample, and hence the degree of reduction in transmission of the red light, is dependent upon the density of fluoride ions in the test sample. Accordingly, the reduction in red light transmission may be measured by photo cell apparatus and used as a measure of fluoride content of the test sample.

One form of automatic colorimeter apparatus in which the foregoing reagent may be used is described in United States Patent No. 3,028,225, issued April 3, 1962, to Robert T. Sheen, and to which reference may be had for a full description of the apparatus. Suffice it to say that the light source is divided into two beams one of which passes through a test sample to a first photo cell, and the other of which falls on a second photo cell. The outputs of the photo cells are balanced against one another through a sensitive meter which indicates changes in light intensity passing through the sample. When used for determining fluoride concentration with the reagent of this invention the light source is provided with filter means for removing light energy below 600 millimicrons wavelength, while the photo cells preferably have a sharp cut-off characteristic for wavelengths over 675 millimicrons. Also, the meter may be calibrated directly in parts per million of fluoride (F−). Of course, the reagent of this invention may be used in other colorimeter apparatus, the described apparatus being given as an example only.

The blue fluoride complex is believed to be represented by the structure

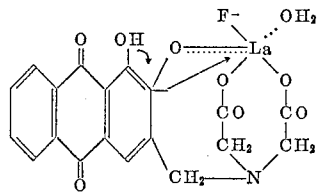

It has been concluded that the entry of the fluoride within the coordinate sphere of the metal causes water molecules to leave and further causes deprotonation of the remaining 1-hydroxyl group. The strong electrophilic effect of the fluoride ion accounts for this shift and causes the partial double bond character of the 2-oxygen metal bond.

The nature of the metal ion is important since, although all of the rare earth metals examined formed red chelates with alizarin complexan, only lanthanum, cerium III, and praseodymium reacted further with the fluoride ion to form the blue complex. The formation of the blue complex by the lanthanum chelate, however, is less subject to interference from other substances such as normal mineral content of water samples, therefore making lanthanum the preferred metal although cerium III or praseodymium could be used.

The addition of sodium acetate-acetic acid buffer, necessary to the most effective formation of the fluoride complex and hence the most effective light absorption characteristics, resulted in partial precipitation of the lanthanum chelate within a few days, making the solution unsuitable as a storable reagent. In order to be acceptable for practical use, fluoridation testing means must be automatic in operation, must be capable of performing continuously repeated tests without the supervision of highly skilled technicians or laboratory experts, and must operate with a supply of materials or reagents that can be stored for reasonable lengths of time to permit periodic shipping to stations remote from a source. While the colorimetric apparatus described in the aforementioned Patent No. 3,028,225 is capable of performing automatically with little supervision, a stable reagent specific to fluoride has, prior to this invention, been unavailable. I have discovered, however, that the addition of dilute isopropanol eliminates the problem of precipitation making the solution stable and useful as a conveniently storable reagent.

Tests of the blue complex forming lanthanum chelate solution directly on city water (for example water of the city of St. Petersburg, Florida) brought out an additional problem of coagulation of blue complex resulting from traces of coagulating agents remaining in the city water from purification processes. In accordance with this invention, such coagulation is effectively prevented by the addition of polyvinyl pyrrolidone to the lanthanum chelate solution. Moreover, the polyvinyl pyrrolidone helps the flow of the resulting reagent through the tubes of the mentioned automatic colorimeter equipment.

A preferred embodiment of the reagent according to this invention is obtained in the manner set forth in the following example.

A solution A is prepared by weighing .980 gram of alizarin complexan dye into 50 ml. of distilled water, adding 0.4 ml. of 50% sodium hydroxide to completely dissolve the dye, adding 80 grams sodium acetate ($3H_2O$), adding 8 ml. of glacial acetic acid, and 120 ml. of isopropanol anhydrous. The latter ingredients are dissolved, and distilled water added to bring the solution to 500 ml.

A solution B is then prepared by weighing 1.304 grams lanthanum nitrate ($6H_2O$) into 100 ml. of distilled water, adding 80 grams sodium acetate ($3H_2O$), adding 152 ml. of glacial acetic acid, and 120 ml. of isopropanol anhydrous. The foregoing is mixed with a paste formed of 20 grams of polyvinyl pyrrolidone and distilled water. Distilled water is then added to the mixture to bring the solution to 500 ml. Solution A and solution B are then mixed to form one liter of the improved reagent embodying the invention.

A reagent so prepared has been found to have a substantially full strength life of approximately 45 days, after which a slight decrease in sensitivity is noted. The reagent is conveniently supplied in one gallon lots, a gallon being sufficient for about one month of repeated testing by means of the automatic colorimeter apparatus as described in the mentioned Patent No. 3,028,225.

The reagent provides unusual accuracy and freedom from interference by substances or conditions normally found in water treated for domestic purposes. For example, the following list shows the amount of such interfering materials or conditions which were found to produce an error of 0.1 part per million in a sample of water containing 0.5 part per million of fluoride (F−).

| | P.p.m. |
|---|---|
| Alkalinity | 1,000 |
| Aluminum | .25 |
| Chloride | 10,000 |
| Iron ($Fe^3$) | 3 |
| Chlorine | 2 |
| Hexametaphosphate | 2 |
| Phosphate | 50 |
| Sulfate | 300 |

From the foregoing detailed description it will be appreciated that the present invention has provided an improved reagent for use in automatic colorimeter equipment in the determination of fluoride content of water. It will also be appreciated that the particularly stable nature of the reagent, together with its resistance to coagulating substances, make it practical for continuously repeated testing of intentionally fluoridated water in a simple, reliable and economical manner.

Although the invention has been described in considerable detail with reference to a specific reagent embodying the invention, it will be understood that the invention is not limited thereby, but rather the invention includes all those substitutions, modifications, and uses as are reasonably embraced by the scope of the claim hereof.

Having described my invention, I claim:

A storable colorimetric reagent for use in single reagent automatic colorimeters to determine minute quantities of fluoride in water, said reagent consisting essentially of an aqueous mixture of:

(a) 3 aminomethylalizarin-NN-diacetic acid in proportion equivalent to about .980 gram per liter of reagent, (b) sodium acetate in proportion equivalent to about 160 grams per liter of reagent, (c) lanthanum nitrate in proportion equivalent to about 1.304 grams per liter of reagent, (d) polyvinyl pyrrolidone in proportion equivalent to about 20 grams per liter of reagent, (e) glacial acetic acid in proportion to about 160 milliliter per liter of reagent, (f) isopropanol in proportion equivalent to about 240 milliliter per liter of reagent and (g) 50% sodium hydroxide in proportion equivalent to about 0.4 milliliter per liter of reagent.

References Cited by the Examiner

Drug and Cosmetic Chemistry 75, July 1954, PVP, pages 32–37.

Talanta 2, 92–93, January 1959, Belcher et al.

Talanta 8, 853–70, December 1961, R. Belcher and T. S. West.

JULIUS GREENWALD, *Primary Examiner.*